(12) United States Patent
O'Brien et al.

(10) Patent No.: US 9,940,280 B1
(45) Date of Patent: Apr. 10, 2018

(54) PROVISIONING AN ENCLOSURE WITH PCIE CONNECTIVITY AND STORAGE DEVICES

(71) Applicant: EMC IP Holding Company LLC, Hopkinton, MA (US)

(72) Inventors: Walter O'Brien, Westborough, MA (US); David W. Harvey, Newton, MA (US); Robert W. Beauchamp, Berlin, MA (US); Steven D. Sardella, North Grafton, MA (US); Antonio L. Fontes, Northbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 14/751,666

(22) Filed: Jun. 26, 2015

(51) Int. Cl.
| | |
|---|---|
| *G06F 13/36* | (2006.01) |
| *G06F 13/00* | (2006.01) |
| *G06F 13/40* | (2006.01) |
| *G06F 11/07* | (2006.01) |
| *G06F 11/20* | (2006.01) |
| *G06F 11/10* | (2006.01) |
| *G06F 3/06* | (2006.01) |
| *G06F 13/38* | (2006.01) |

(52) U.S. Cl.
CPC .......... *G06F 13/4022* (2013.01); *G06F 3/065* (2013.01); *G06F 3/0608* (2013.01); *G06F 3/0685* (2013.01); *G06F 11/0787* (2013.01); *G06F 11/1088* (2013.01); *G06F 11/2056* (2013.01); *G06F 13/382* (2013.01)

(58) Field of Classification Search
None
See application file for complete search history.

(56) References Cited

U.S. PATENT DOCUMENTS

| | | | |
|---|---|---|---|
| 8,413,164 B1 | 4/2013 | Jensen-Fellows et al. | |
| 9,026,708 B1 | 5/2015 | Fenton et al. | |
| 9,158,540 B1 | 10/2015 | Tzelnic et al. | |
| 9,286,261 B1 | 3/2016 | Tzelnic et al. | |
| 2010/0312942 A1* | 12/2010 | Blinick | G06F 13/4022 710/316 |
| 2014/0052309 A1* | 2/2014 | Chandrasekhar | G06F 1/26 700/297 |
| 2014/0149658 A1* | 5/2014 | Boyd | G06F 3/0607 711/112 |
| 2014/0173072 A1* | 6/2014 | Chandrasekhar | G06F 9/00 709/223 |
| 2015/0317272 A1* | 11/2015 | Tanaka | G06F 13/385 710/301 |
| 2016/0077841 A1* | 3/2016 | Lambert | G06F 13/4022 713/2 |

* cited by examiner

*Primary Examiner* — Hyun Nam
(74) *Attorney, Agent, or Firm* — BainwoodHuang (57) ABSTRACT

An electronic assembly perform data storage operations on behalf of a set of storage processors (SPs). The electronic assembly includes an enclosure, and a set of peripheral component interconnect express (PCIe) switches which installs within the enclosure. The set of PCIe switches is constructed and arranged to connect to the set of SPs while the set of SPs is external to the enclosure. The electronic assembly further includes a set of data storage devices which installs within the enclosure. The set of data storage devices is constructed and arranged to persistently store data on behalf of the set of SPs via PCIe-based communications through the set of PCIe switches.

21 Claims, 7 Drawing Sheets

PROVISIONING AN ENCLOSURE WITH PCIE CONNECTIVITY AND STORAGE DEVICES

BACKGROUND

An example of a conventional rack-mount data storage system is a disk processor enclosure (DPE) which includes, among other things, a pair of physical storage processors (SPs) and hard drives. The physical SPs process input/output (I/O) requests such as small computer system interface (SCSI) commands from external host computers in order to store host data into the hard drives and load host data from the hard drives on behalf of the external host computers. The hard drives of the DPE may be flash memory drives or magnetic disk drives such as serial attached SCSI (SAS) drives which connect to the pair of SPs via a pair of internal SAS switches.

To increase storage capacity, the operator of the DPE may connect one or more disk-array enclosures (DAEs) containing additional drives to the DPE. One conventional DAE includes (i) a pair of SAS switches which communicate directly with the SPs of the DPE (e.g., link control cards), and (ii) SAS drives. Another conventional DAE includes (i) a pair of peripheral component interconnect express (PCIe) switches which communicate directly with the SPs of the DPE, and (ii) PCIe drives.

To increase connectivity, the operator of the DPE may connect an I/O expansion enclosure which is dedicated to augmenting communications with external equipment. One conventional I/O expansion module includes a pair of PCIe switches which communicate directly with the SPs, as well as front-end I/O modules to connect to external host computers and/or back-end I/O modules to connect to other DAEs.

SUMMARY

Unfortunately, there are deficiencies to the above-described conventional data storage equipment in which an operator expands DPE storage capacity by adding DAEs and increases DPE I/O connectivity by adding I/O expansion enclosures. For example, situations may arise in which it is appropriate to increase both storage capacity and connectivity while under particular cost restrictions, space restrictions, and so on.

In contrast to the above-described conventional data storage equipment in which a DPE (i) expands storage capacity using DAEs and (ii) increases IO connectivity using I/O expansion enclosures, improved techniques are directed to provisioning an enclosure with PCIe switches and a set of data storage devices. With PCIe switches and a set of data storage devices in a common chassis, storage capacity and I/O connectivity are simultaneously enhanced within a single enclosure. Such an enclosure may not only increase equipment density but also minimize expansion costs for certain situations under particular cost and space restrictions.

One embodiment is directed to a method of provisioning an enclosure to perform data storage operations on behalf of a set of SPs. The method includes installing a set of peripheral component interconnect express (PCIe) switches within the enclosure. The method further includes connecting the set of PCIe switches to the set of SPs, the set of SPs being external to the enclosure. The method further includes installing a set of data storage devices within the enclosure, the set of data storage devices being constructed and arranged to persistently store data on behalf of the set of SPs via PCIe-based communications through the set of PCIe switches.

In some arrangements, installing the set of data storage devices within the enclosure includes inserting a set of PCIe-based data storage devices into the enclosure. Here, each PCIe-based data storage device is constructed and arranged to communicate directly with the set of PCIe switches via PCIe communications.

In some arrangements, the method further includes installing a set of serial attached small computer system interface (SAS) switches (and bus adapters) within the enclosure. In these arrangements, at least some of data storage devices are constructed and arranged to persistently store data on behalf of the set of SPs via (i) the PCIe-based communications through the set of PCIe switches and (ii) SAS-based communications through the set of SAS controllers.

In some arrangements, installing the set of data storage devices within the enclosure includes inserting a set of SAS-based data storage devices into the enclosure. Here, each SAS-based data storage device is constructed and arranged to communicate directly with the set of SAS controllers via SAS communications.

In some arrangements, the enclosure includes both PCIe-based data storage devices and SAS-based data storage devices.

In some arrangements, the enclosure defines a front opening at a front side of the enclosure and a back opening at a back side of the enclosure, the front side being opposite the back side. In these arrangements, each PCIe switch inserts through the back opening at the back side of the enclosure, each SAS switch inserts through the back opening at the back side of the enclosure, and each data storage device inserts through the front opening at the front side of the enclosure.

In some arrangements, the method further includes installing a set of interconnecting hardware modules within the enclosure. Here, each interconnecting hardware module being constructed and arranged to interconnect a respective PCIe switch to a respective SAS switch.

In some arrangements, the method further includes, after the set of PCIe switches is installed within the enclosure, configuring the PCIe switches of the set of PCIe switches to communicate with each other via PCIe communications. Along these lines, the set of SPs includes a first SP and a second SP which are external to the enclosure. Furthermore, configuring the PCIe switches includes, after the set of PCIe switches is connected to the set of SPs, configuring the PCIe switches of the set of PCIe switches to provide a cache mirroring pathway between the first SP and the second SP which are external to the enclosure to enable the first and second SPs to mirror SP caches through the enclosure.

Another embodiment is directed to an electronic assembly to perform data storage operations on behalf of a set of SPs. The electronic assembly includes an enclosure, and a set of PCIe switches which installs within the enclosure. The set of PCIe switches is constructed and arranged to connect to the set of SPs while the set of SPs is external to the enclosure. The electronic assembly further includes a set of data storage devices which installs within the enclosure. The set of data storage devices is constructed and arranged to persistently store data on behalf of the set of SPs via PCIe-based communications through the set of PCIe switches.

In some arrangements, the set of PCIe switches includes a first PCIe switch that operates on behalf of a first SP, and a second PCIe switch that operates on behalf of a second SP. In these arrangements, the electronic assembly further includes:

(i) a first set of front-end input/output (IO) modules which installs within the enclosure, the first set of front-end I/O modules being constructed and arranged to connect the first PCIe switch to a set of external host computers, (ii) a first set of back-end IO modules which installs within the enclosure, the first set of back-end I/O modules being constructed and arranged to connect the first PCIe switch to a set of external disk-array enclosures (DAEs), (iii) a second set of front-end IO modules which installs within the enclosure, the second set of front-end I/O modules being constructed and arranged to connect the second PCIe switch to the set of external host computers, and (iv) a second set of back-end IO modules which installs within the enclosure, the second set of back-end I/O modules being constructed and arranged to connect the second PCIe switch to the set of external DAEs.

It should be understood that, in the cloud context, some electronic circuitry may be formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in provisioning an enclosure with PCIe connectivity and storage devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to provisioning an enclosure with peripheral component interconnect express (PCIe) switches and a set of data storage devices. With PCIe switches and a set of data storage devices in a common housing, storage capacity and input/output (I/O) connectivity are simultaneously increased within a single enclosure. Such an enclosure may not only increase equipment density but also minimize expansion costs for certain situations under particular cost and space restrictions.

Figure 1:
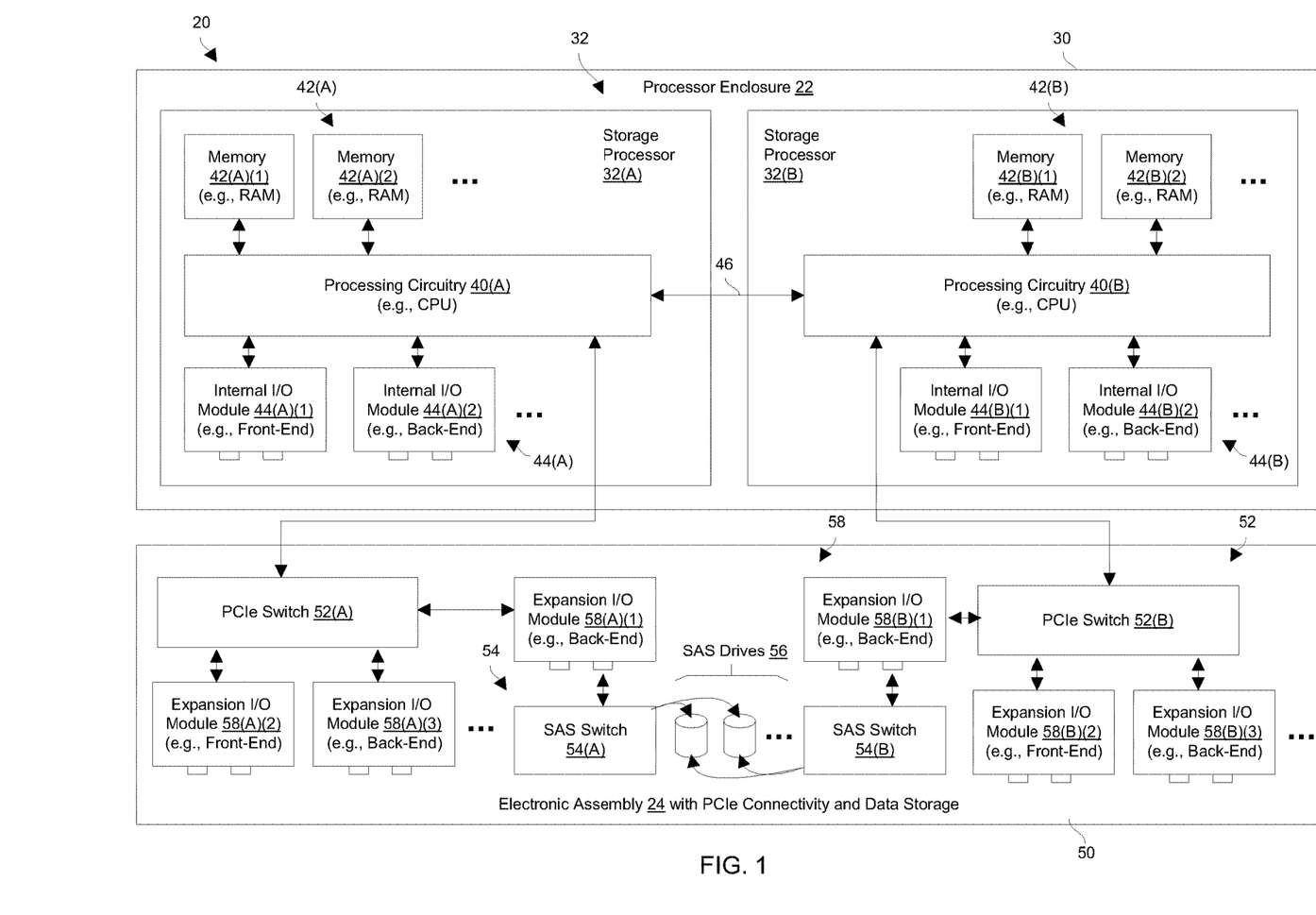
FIG. 1 is a block diagram of an example data storage system which includes an electronic assembly having a set of peripheral component interconnect express (PCIe) switches and a set of data storage devices, e.g., serial attached small computer system interface (SAS) storage devices.

FIG. 1 shows a data storage environment 20 which utilizes an enclosure provisioned with PCIe connectivity and storage devices. In particular, the data storage environment 20 includes a processor enclosure 22 and an electronic assembly 24.

The processor enclosure 22 includes a frame (or chasis) 30 and a set of physical storage processors 32(A), 32(B) (collectively, SPs 32). The SP 32(A) includes processing circuitry 40(A) (i.e., one or more processors or CPUs), memory modules 42(A)(1), 42(A)(2), . . . (collectively memory 42(A)), and a set of internal input/output (I/O) modules 44(A)(1), 44(A)(2), . . . (collectively, I/O modules 44(A)). Similarly, the SP 32(B) includes processing circuitry 40(B), memory modules 42(B)(1), 42(B)(2), . . . (collectively memory 42(B)), and a set of internal input/output (I/O) modules 44(B)(1), 44(B)(2), . . . (collectively, I/O modules 44(B)).

Each physical SP 32 is constructed and arranged to perform data storage operations in response to I/O requests, e.g., small computer system interface (SCSI) commands, from one or more host computers. During such operation, each SP 32 is constructed and arranged to mirror certain contents of its data cache through an internal communications pathway 46.

It should be understood that the processor enclosure 22 may include other components as well but which are omitted from FIG. 1 for simplicity (e.g., storage devices, redundant power supplies, fan units, etc.). In some arrangements, there is redundancy among these components in order to enable the processor enclosure 22 to remain operational (i.e., to enable the processor enclosure 22 to continue processing I/O requests) even after sustaining a component failure.

The electronic assembly 24 includes a physical enclosure (or housing) 50, a set of PCIe switches 52(A), 52(B) (collectively, PCIe switches 52), a set of SAS switches or controllers 54(A), 54(B) (collectively, SAS switches 54), a set of serial attached SCSI (SAS) drives 56 (i.e., one or more SAS drives 56), and a set of expansion I/O modules 58(A)(1), 58(A)(2), 58(A)(3), . . ., 58(B)(1), 58(B)(2), 58(B)(3), . . . (collectively, expansion I/O modules 58). Each SAS drive 56 (e.g., a flash memory drive, a magnetic disk drive, etc.) is capable of storing large amounts of data (e.g., gigabytes, terabytes, etc.) in a persistent/non-volatile manner. Additionally, each SAS drive 56 is accessible by multiple SAS switches 54 via SAS-based communications (and indirectly by multiple PCIe switches 52 via PCIe-based communications) for fault tolerance (i.e., there are multiple paths to each SAS drive 56).

Furthermore, each expansion I/O module 58 includes multiple ports for improved I/O connectivity. In some arrangements, each SAS switch 54 includes multiple communications ports thus enabling that SAS switch 54 to communicate with a PCIe switch 52 which is local to the electronic assembly 24 and perhaps one or more other devices via SAS-based communications (e.g., to link to another electronic assembly 24, a disk-array enclosure, etc.).

It should be appreciated that the substantially symmetrical appearance of the electronic assembly 24 is purposeful. In particular, the electronic assembly 24 is provisioned with multiple components and multiple pathways so that the electronic assembly 24 can remain operational even in the event of a failure (e.g., failure of a PCIe switch 52, a SAS switch 54, a cable, etc.). Further details will now be provided with reference to FIGS. 2 and 3.

Figure 2:
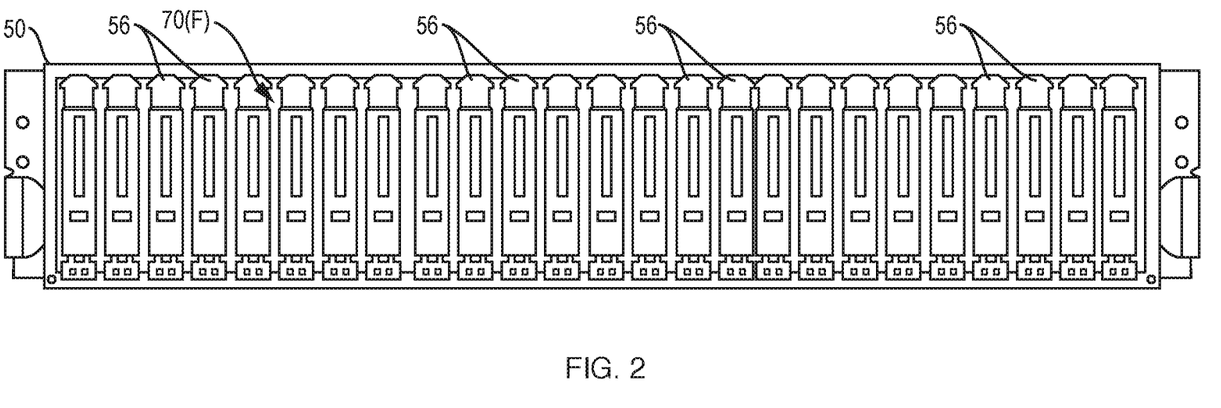
FIG. 2 is a front view of the electronic assembly of FIG. 1.
Figure 3:
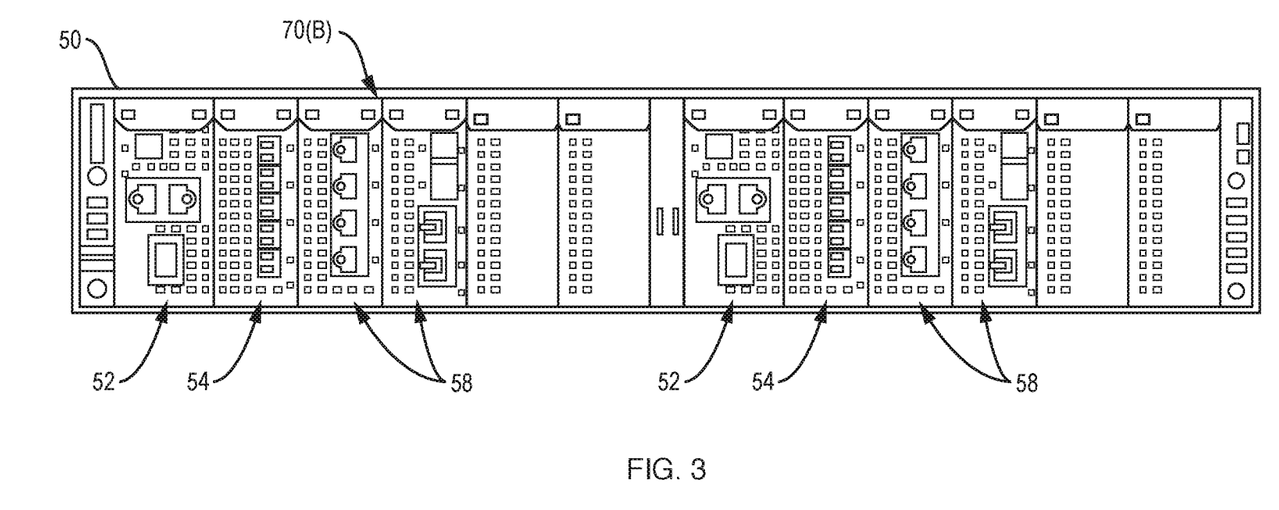
FIG. 3 is a rear view of the electronic assembly of FIG. 1.

FIGS. 2 and 3 provide further details of the electronic assembly 24. FIG. 2 shows a front view of the electronic assembly 24. FIG. 3 shows a rear view of the electronic assembly 24.

As shown in FIG. 2, the physical enclosure 50 defines a front opening 70(F) at a front side of the physical enclosure 50. To install the SAS drives 56, an operator inserts the SAS drives 56 through the front opening 70(F) to connect the SAS drives 56 with the SAS switches 54 (e.g., via an interconnect or mid-plane). By way of example, there are 25 SAS drives 56 arranged in a single row along the front opening 70(F).

As shown in FIG. 3, the physical enclosure 50 defines a back opening 70(B) at a back side of the physical enclosure 50 which is opposite the front side. To install the PCIe switches 52, the operator inserts the PCIe switches 52 through the back opening 70(B) to connect with the expansion I/O modules 58 (e.g., via an interconnect or mid-plane). Additionally, to install the SAS switches 54, the operator inserts the PCIe switches 54 through the back opening 70(B) to connect with the expansion I/O modules 58 and the SAS drives 56. Furthermore, to install the expansion I/O modules 58, the operator inserts the expansion I/O modules 58 through the back opening 70(B) to connect with the PCIe switches 52 and perhaps the SAS switches 54.

One should appreciate that the layout of data storage devices (e.g., the SAS drives 56) at the front of the physical enclosure 50, and the expansion I/O modules 58 at the back of the physical enclosure allows the operator to access the data storage devices conveniently from the front while hiding cabling (e.g., cables connecting the PCIe switches 52 to the SPs 32 of the processor enclosure 22, etc.) at the back. Moreover, air flow to cool the electronic assembly components can be controlled easily (e.g., input through the front opening 70(A) and exhausted out the back opening 70(B)). In some arrangements, at least some of the hardware components of the electronic assembly 24 have a hot swappable or field replacement unit (FRU) form factor for easy replacement while the data storage equipment remains powered up for high availability.

It should be understood that the electronic assembly 24 may include other components as well but which are omitted from FIGS. 1-3 for simplicity (e.g., a mid-plane or interconnect, fan units, etc.). Further details will now be provided with reference to FIG. 4.

Figure 4:
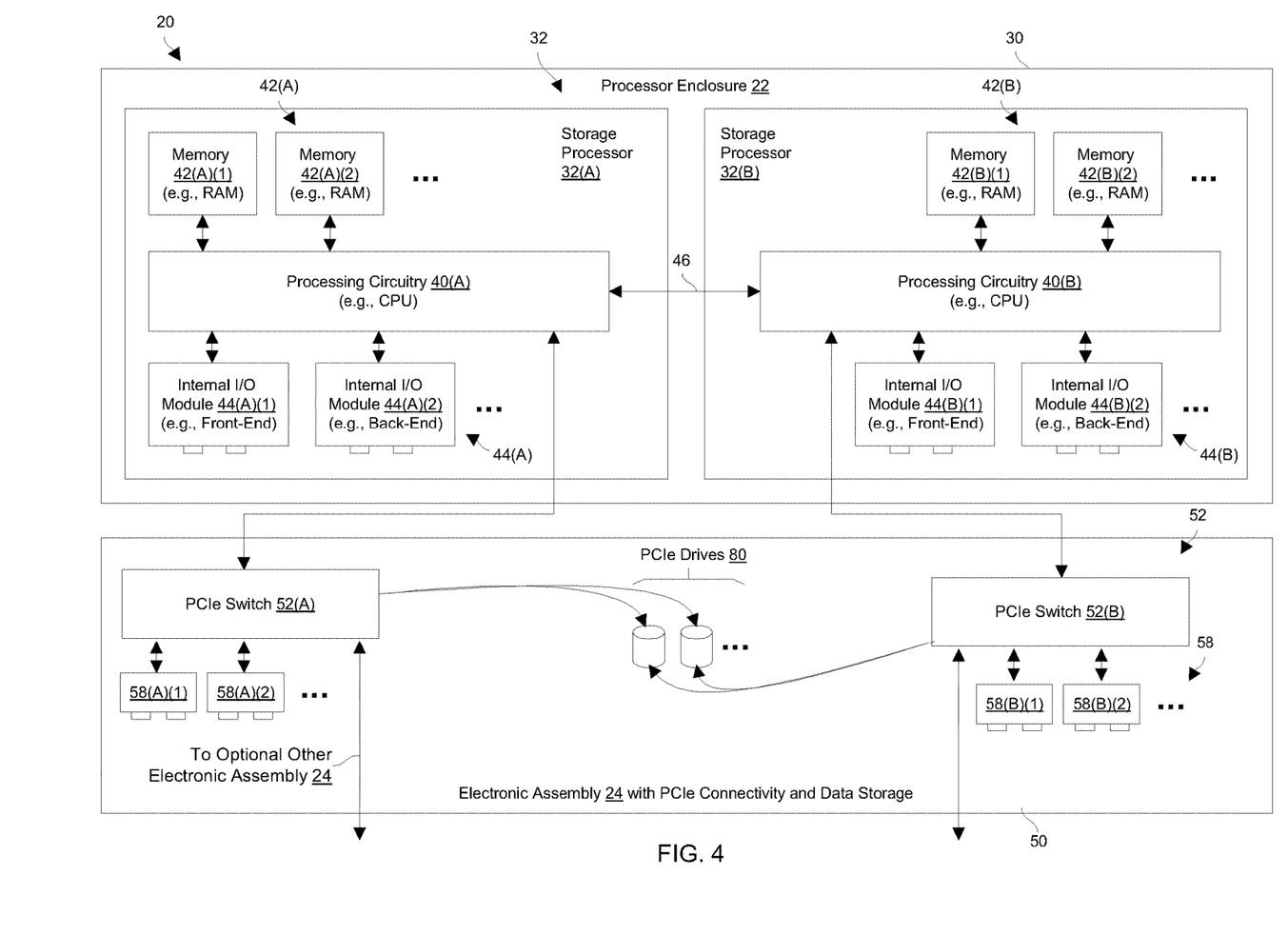
FIG. 4 is a block diagram of the electronic assembly of FIG. 1 which includes both PCIe storage devices and SAS storage devices.
Figure 5:
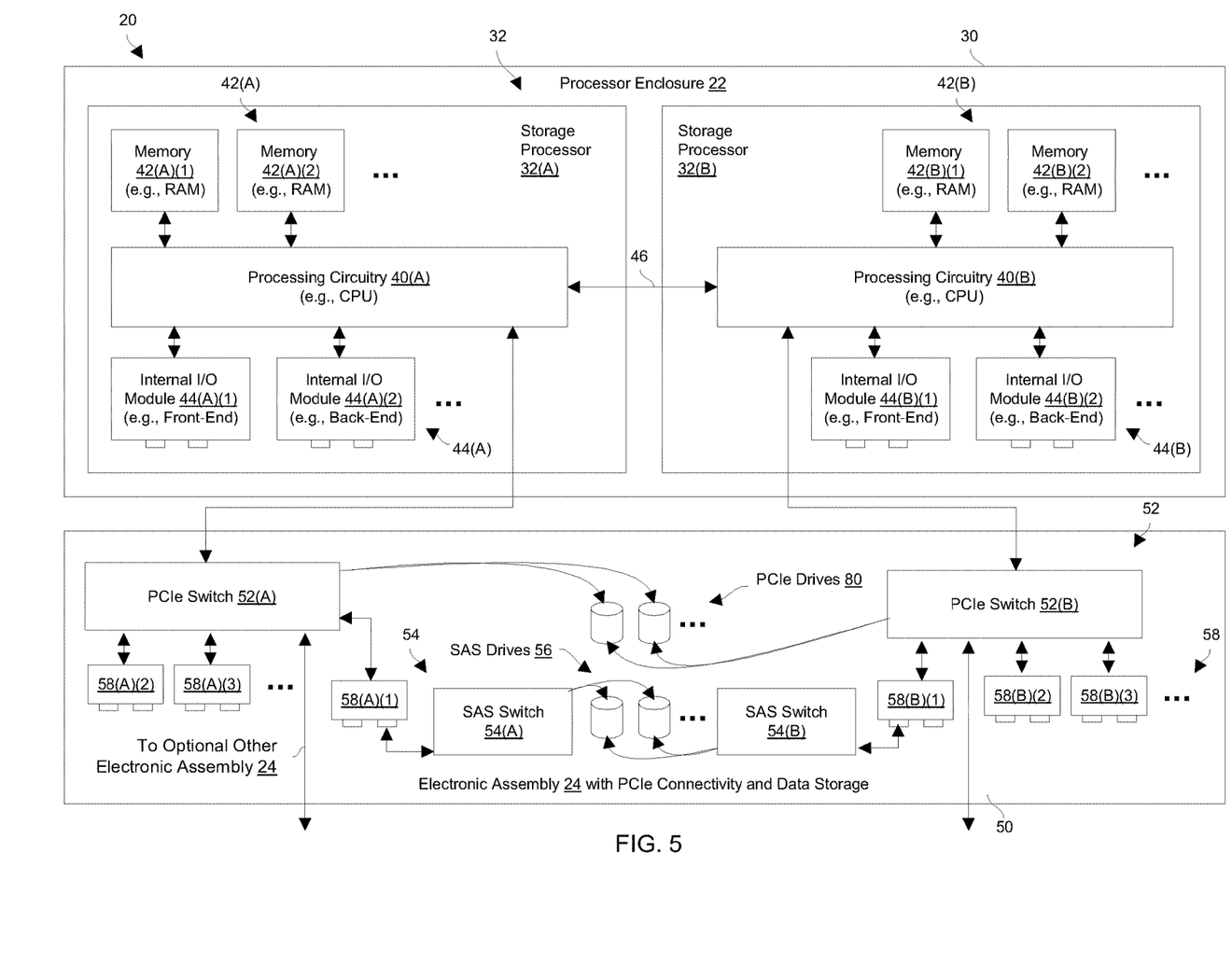
FIG. 5 is a block diagram of the electronic assembly of FIG. 1 which includes only PCIe storage devices.
Figure 6:
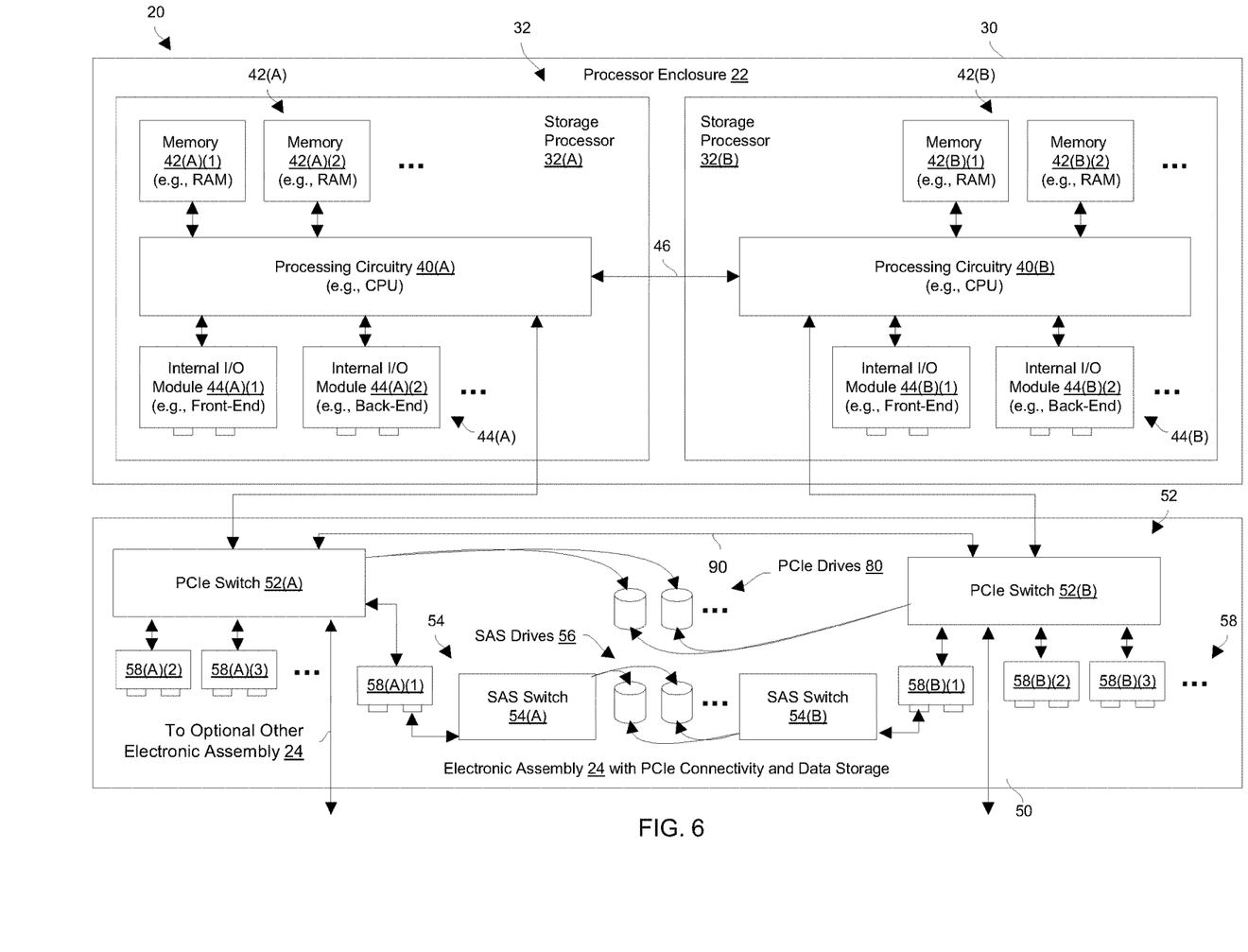
FIG. 6 is a block diagram of the electronic assembly of FIG. 1 which includes a cache mirroring pathway.

FIGS. 4 through 6 illustrate a variety of enhancements and/or modifications that can be made to the electronic assembly 24 to accommodate particular data storage resource requirements. FIGS. 4 shows the electronic assembly 24 when provisioned with PCIe drives 80 rather than SAS drives 56. FIG. 5 shows the electronic assembly 24 when provisioned with both PCIe drives 80 and SAS drives 56. FIG. 6 shows the electronic assembly 24 when provisioned with connectivity between the PCIe switches 52 to form a pathway which enables the physical SPs of the processor enclosure 22 (FIG. 1) to perform cache mirroring operations through the electronic assembly 24.

As shown in FIG. 4, the electronic assembly 24 may include PCIe drives 80 in place of the SAS drives 56. These PCIe drives 80 communicate directly with the PCIe switches 52 via PCIe-based communications thus alleviating the need for the SAS switches 54.

Each PCIe drive 80 (e.g., a flash memory drive, a magnetic disk drive, etc.) is capable of storing large amounts of data (e.g., gigabytes, terabytes, etc.) in a persistent/non-volatile manner. Additionally, each PCIe drive 80 is accessible by multiple PCIe switches 52 for fault tolerance (i.e., there are multiple paths to each PCIe drive 80).

As further shown in FIG. 4, the PCIe switches 52 are able to communicate with other external equipment such as another electronic assembly 24 for further expansion. In particular, the each PCIe switch 52 which is local to the electronic assembly 24 can connect directly to another PCIe switch 52 which is remote (i.e., a PCIe switch 52 of another electronic assembly 24).

As shown in FIG. 5, the electronic assembly 24 may include both PCIe drives 80 and SAS drives 56. Here, the PCIe drives 80 communicate directly with the PCIe switches 52 via PCIe-based communications. Likewise, the SAS drives 56 communicate directly with the SAS switches 54 via SAS-based communications.

In some arrangements, the enclosure 50 provides separate slots for each type of data storage device. That is, the enclosure 50 defines a first group of slots which are unique for PCIe drives 80, and a second group of slots which are unique for SAS drives 56.

In other arrangements, the enclosure 50 defines standard slots that are capable of receiving either PCIe drives 80 or SAS drives 56. For example, the interconnect or mid-plane within the enclosure 50 can be provisioned with SFF-8639 connectors or the like in order to make each slot suitable for receiving a PCIe drive 80 or a SAS drive 56.

As mentioned earlier in connection with FIG. 4, the electronic assembly 24 arrangement of FIG. 5 optionally enables the PCIe switches 52 to communicate with other external equipment such as another electronic assembly 24 for further expansion. That is, the each PCIe switch 52 which is local to the electronic assembly 24 can connect directly to another PCIe switch 52 which is remote (i.e., a PCIe switch 52 of another electronic assembly 24).

As shown in FIG. 6, the PCIe switches 52 of the electronic assembly 24 may be interconnected to form a pathway 90 which enables PCIe-to-PCIe communications between the PCIe switches 52. With such a pathway 90 available for PCIe-to-PCIe communications, the electronic assembly 24 is now capable of conveying SP-to-SP communications. Accordingly, if the internal pathway 46 were to sustain a failure, the SPs 32 are able to communicate with each other via the PCIe switches 52 of the electronic assembly 24 (e.g., for cache mirroring operations).

In some arrangements, the PCIe switches 52 form a dedicated pathway 90 for cache mirroring between the SPs 32. Such arrangements alleviate the need for the internal pathway 46 of the processor enclosure 22 (e.g., to save space, cost, etc. for the SPs 32).

It should be understood that the electronic assembly 24 of FIG. 6 may include data storage devices in addition to the pathway 90. In some arrangements, the electronic assembly 24 of FIG. 6 includes PCIe drives 80 and/or connectivity to another electronic assembly 24. In other arrangements, the electronic assembly 24 of FIG. 6 includes SAS drives 56. In yet other arrangements, the electronic assembly 24 of FIG. 6 includes both PCIe drives 80 and SAS drives 56, and so on. Further details will now be provided with reference to FIG. 7.

Figure 7:
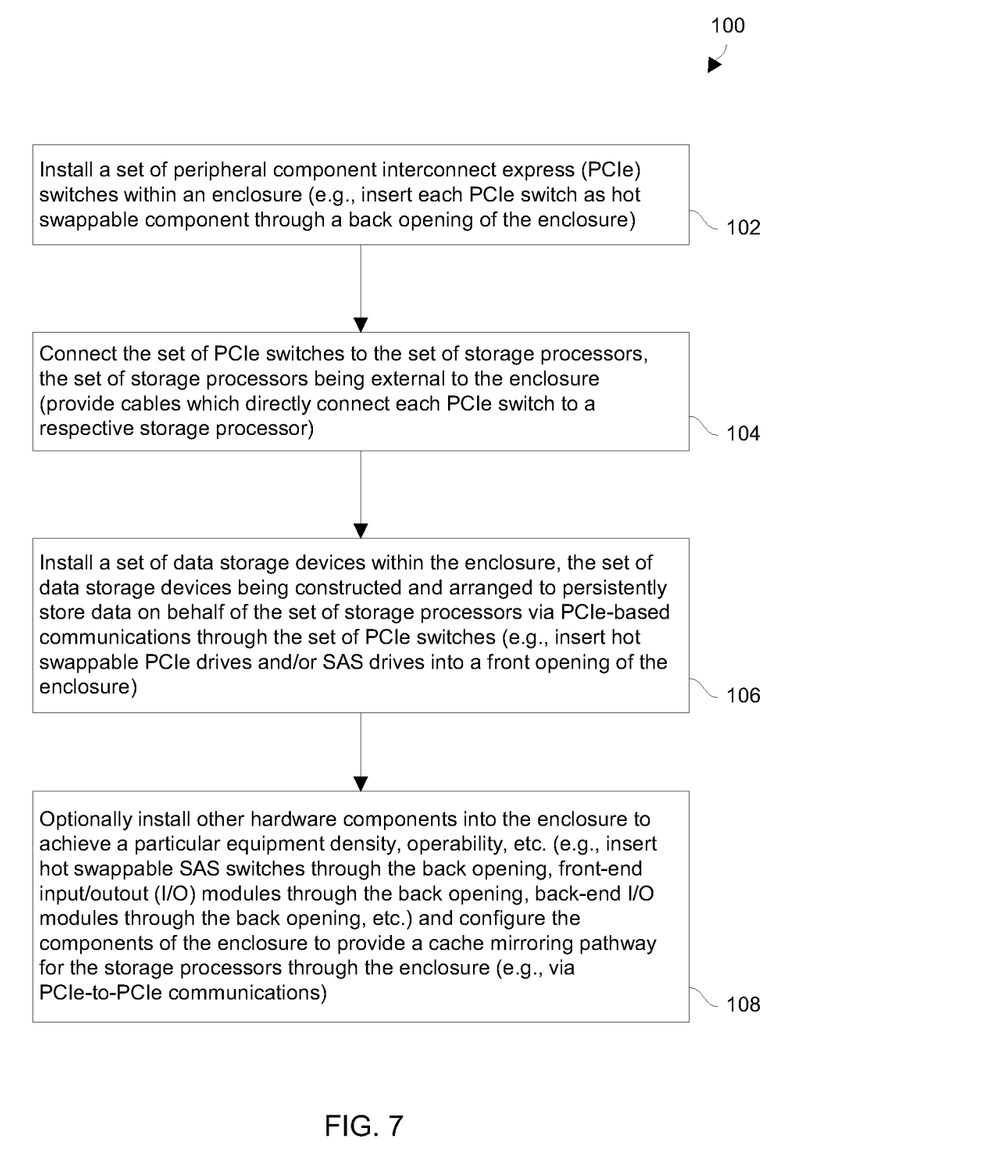
FIG. 7 is a flowchart of a procedure which is performed by the electronic assembly of FIG. 1.

FIG. 7 is a flowchart of a procedure 100 which is performed by a manufacturer, a human operator, etc. of the electronic assembly 24 (hereinafter referred to as a user). In particular, the user provisions an enclosure to perform data storage operations on behalf of a set of SPs.

At 102, the user installs a set of PCIe switches within the enclosure. As mentioned earlier, each PCIe switch may be hot swappable and insert through a back opening of the enclosure.

At 104, the user connects the set of PCIe switches to the set of SPs, the set of SPs being external to the enclosure. Along these lines, the user may connect each PCIe switch to a respective SP via a cable (also see FIG. 1).

At 106, the user installs a set of data storage devices within the enclosure. For example, the user may insert hot swappable PCIe drives and/or SAS drives which store data in a non-volatile manner on behalf of the set of SPs via PCIe-based communications through the set of PCIe switches.

At 108, the user optionally installs other hardware components into the enclosure to achieve improved rack density, operability, etc. In some arrangements, the user inserts a set of front-end I/O modules through the back opening of the enclosure to connect the set of PCIe switches to a set of external host computers. In some arrangements, the user inserts a set of back-end I/O modules through the back opening of the enclosure to connect the set of PCIe switches to a set of external disk-array enclosures (DAEs). In some arrangements, the user installs a set of SAS switches (as well as a set of back-end I/O modules) for connectivity to a set of SAS drives within the enclosure, and so on.

Additionally, at 108, the user may configure the PCIe switches to directly communicate with each other via PCIe communications. Along these lines, the PCIe switches are able to form a PCIe-to-PCIe pathway which the SPs can use to for cache mirroring purposes, i.e., the SPs are then able to mirror certain contents of their caches through the enclosure.

As described above, improved techniques are directed to provisioning an enclosure 50 with PCIe switches 52 and a set of data storage devices 56, 80. With PCIe switches and a set of data storage devices 56, 80 in a common chassis, storage capacity and I/O connectivity are simultaneously enhanced within a single enclosure 50. Such an enclosure 50 may not only increase equipment density but also minimize expansion costs for certain situations under particular cost and space restrictions.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the individual features of the particular embodiments, examples, and implementations disclosed herein can be combined in any manner that makes technological sense. Moreover, such features are hereby combined in such manners to form all possible combinations, permutations and variants except to the extent that such combinations, permutations and/or variants have been explicitly excluded or are impractical.

Furthermore, it should be understood that in some arrangements the electronic assembly 24 includes other components/hardware/etc. Along these lines, in some arrangements which include both PCIe drives and serial advanced technology attachment (SATA) drives, the SATA drives may be reached through SAS-SATA protocol converters (e.g., in each drive canister).

Additionally, it should be understood that the electronic assembly 24 was illustrated as using multiport storage devices by way of example only. In other arrangements, single port storage devices are used. Along these lines, the electronic assembly 24 may include a single controller which communicates with other enclosures via controller-to-controller communications to achieve fault tolerant techniques such as mirroring and/or erasure encoding between controllers.

Furthermore, it should be understood that the particular arrangements for the electronic assembly 24 were shown in the figures to have a certain number of modules/components by way of example only. It should be understood that there are different numbers of modules/components in other arrangements (e.g., different groupings of components). For example, in some arrangements, the electronic assembly 24 has three separate modules for PCIe switch, SAS controller, and SAS switch. However, in other arrangements, the electronic assembly 24 has one module for PCIe switch, SAS controller, and SAS switch, and so on. Support for such combinations, permutations and variants is considered to exist in this document and are intended to belong to various embodiments of the disclosure.

What is claimed is:

1. A method of provisioning an enclosure to perform data storage operations on behalf of a set of storage processors, the method comprising:
    installing a set of peripheral component interconnect express (PCIe) switches within the enclosure;
    connecting the set of PCIe switches to the set of storage processors, the set of storage processors being external to the enclosure; and
    installing a set of data storage devices within the enclosure, the set of data storage devices being constructed and arranged to persistently store data on behalf of the set of storage processors via PCIe-based communications through the set of PCIe switches;
    wherein connecting the set of PCIe switches to the set of storage processors includes coupling the set of PCIe switches to the set of storage processors while the set of storage processors are connected to an electronic assembly which includes (i) another enclosure, (ii) another set of PCIe switches which installs within the other enclosure, and (iii) another set of data storaae devices which installs within the other enclosure;
    wherein the set of storage processors includes a first storage processor and a second storaae processor which are external to the enclosure; and
    wherein the method further comprises:
    after the set of PCIe switches is connected to the set of storage processors, configuring the PCIe switches of the set of PCIe switches to provide a cache mirroring pathway between the first storage processor and the second storage processor which are external to the enclosure to enable the first and second storage processors to mirror storage processor caches through the enclosure.

2. A method as in claim 1 wherein installing the set of data storage devices within the enclosure includes:
inserting a set of PCIe-based data storage devices into the enclosure, each PCIe-based data storage device being constructed and arranged to communicate directly with the set of PCIe switches via PCIe communications.

3. A method as in claim 1, further comprising:
installing a set of serial attached small computer system interface (SAS) switches within the enclosure; and
wherein at least some of data storage devices are constructed and arranged to persistently store data on behalf of the set of storage processors via (i) the PCIe-based communications through the set of PCIe switches and (ii) SAS-based communications through the set of SAS controllers.

4. A method as in claim 3 wherein installing the set of data storage devices within the enclosure includes:
inserting a set of SAS-based data storage devices into the enclosure, each SAS-based data storage device being constructed and arranged to communicate directly with the set of SAS controllers via SAS communications.

5. A method as in claim 3 wherein installing the set of data storage devices within the enclosure includes:
inserting a set of PCIe-based data storage devices into the enclosure, each PCIe-based data storage device being constructed and arranged to communicate directly with the set of PCIe switches via PCIe communications, and
inserting a set of SAS-based data storage devices into the enclosure, each SAS-based data storage device being constructed and arranged to communicate directly with the set of SAS controllers via SAS communications.

6. A method as in claim 3 wherein the enclosure defines a front opening at a front side of the enclosure and a back opening at a back side of the enclosure, the front side being opposite the back side;
wherein installing the set of PCIe switches includes inserting each PCIe switch through the back opening at the back side of the enclosure,
wherein installing the set of SAS controllers includes inserting each SAS switch through the back opening at the back side of the enclosure, and
wherein installing the set of data storage devices includes inserting each data storage device through the front opening at the front side of the enclosure.

7. A method as in claim 1, further comprising:
installing a set of interconnecting hardware modules within the enclosure, each interconnecting hardware module being constructed and arranged to interconnect a respective PCIe switch to a respective SAS switch.

8. A method as in claim 7 wherein the set of PCIe switches includes a first PCIe switch that operates on behalf of a first storage processor, and a second PCIe switch that operates on behalf of a second storage processor; and wherein the method further comprises:
installing a first set of front-end input/output (IO) modules within the enclosure, the first set of front-end I/O modules being constructed and arranged to connect the first PCIe switch to a set of external host computers,
installing a first set of back-end IO modules within the enclosure, the first set of back-end I/O modules being constructed and arranged to connect the first PCIe switch to a set of external disk-array enclosures (DAEs),
installing a second set of front-end IO modules within the enclosure, the second set of front-end I/O modules being constructed and arranged to connect the second PCIe switch to the set of external host computers, and
installing a second set of back-end IO modules within the enclosure, the second set of back-end I/O modules being constructed and arranged to connect the second PCIe switch to the set of external DAEs.

9. A method as in claim 1, further comprising:
after the set of PCIe switches is installed within the enclosure, configuring the PCIe switches of the set of PCIe switches to communicate with each other via PCIe communications.

10. An electronic assembly to perform data storage operations on behalf of a set of storage processors, the electronic assembly comprising:
an enclosure;
a set of peripheral component interconnect express (PCIe) switches which installs within the enclosure, the set of PCIe switches being constructed and arranged to connect to the set of storage processors while the set of storage processors is external to the enclosure; and
a set of data storage devices which installs within the enclosure, the set of data storage devices being constructed and arranged to persistently store data on behalf of the set of storage processors via PCIe-based communications through the set of PCIe switches;
wherein, when the set of PCIe switches connects to the set of storage processors, the set of PCIe switches couples to the set of storage processors while the set of storage processors are connected to an electronic assembly which includes (i) another enclosure, (ii) another set of PCIe switches which installs within the other enclosure, and (iii) another set of data storage devices which installs within the other enclosure;
wherein the set of storage processors includes a first storage processor and a second storage processor which are external to the enclosure; and
wherein the PCIe switches of the set of PCIe switches are configured to provide a cache mirroring pathway between the first storage processor and the second storage processor which are external to the enclosure to enable the first and second storage processors to mirror their storage processor caches through the enclosure.

11. An electronic assembly as in claim 10 wherein the set of data storage devices includes:
a set of PCIe-based data storage devices which inserts into the enclosure, each PCIe-based data storage device being constructed and arranged to communicate directly with the set of PCIe switches via PCIe communications.

12. An electronic assembly as in claim 10, further comprising:
a set of serial attached small computer system interface (SAS) switches which installs within the enclosure; and
wherein at least some of data storage devices are constructed and arranged to persistently store data on behalf of the set of storage processors via (i) the PCIe-based communications through the set of PCIe switches and (ii) SAS-based communications through the set of SAS controllers.

13. An electronic assembly as in claim 12 wherein the set of data storage devices includes:
a set of SAS-based data storage devices which inserts into the enclosure, each SAS-based data storage device being constructed and arranged to communicate directly with the set of SAS controllers via SAS communications.

14. An electronic assembly as in claim 12 wherein the set of data storage devices includes:
- a set of PCIe-based data storage devices which inserts into the enclosure, each PCIe-based data storage device being constructed and arranged to communicate directly with the set of PCIe switches via PCIe communications, and
- a set of SAS-based data storage devices which inserts into the enclosure, each SAS-based data storage device being constructed and arranged to communicate directly with the set of SAS controllers via SAS communications.

15. An electronic assembly as in claim 12 wherein the enclosure defines a front opening at a front side of the enclosure and a back opening at a back side of the enclosure, the front side being opposite the back side;
- wherein each PCIe switch inserts through the back opening at the back side of the enclosure,
- wherein each SAS switch inserts through the back opening at the back side of the enclosure, and
- wherein each data storage device inserts through the front opening at the front side of the enclosure.

16. An electronic assembly as in claim 10, further comprising:
- a set of interconnecting hardware modules which installs within the enclosure, each interconnecting hardware module being constructed and arranged to interconnect a respective PCIe switch to a respective SAS switch.

17. An electronic assembly as in claim 16 wherein the set of PCIe switches includes a first PCIe switch that operates on behalf of a first storage processor, and a second PCIe switch that operates on behalf of a second storage processor; and wherein the electronic assembly further comprises:
- a first set of front-end input/output (IO) modules which installs within the enclosure, the first set of front-end I/O modules being constructed and arranged to connect the first PCIe switch to a set of external host computers,
- a first set of back-end IO modules which installs within the enclosure, the first set of back-end I/O modules being constructed and arranged to connect the first PCIe switch to a set of external disk-array enclosures (DAEs),
- a second set of front-end IO modules which installs within the enclosure, the second set of front-end I/O modules being constructed and arranged to connect the second PCIe switch to the set of external host computers, and
- a second set of back-end IO modules which installs within the enclosure, the second set of back-end I/O modules being constructed and arranged to connect the second PCIe switch to the set of external DAEs.

18. An electronic assembly as in claim 10 wherein the PCIe switches of the set of PCIe switches are configured to communicate with each other via PCIe communications.

19. An electronic assembly as in claim 18 wherein the set of storage processors includes a first storage processor and a second storage processor which are external to the enclosure; and
- wherein the PCIe switches of the set of PCIe switches are configured to provide a cache mirroring pathway between the first storage processor and the second storage processor which are external to the enclosure to enable the first and second storage processors to mirror their storage processor caches through the enclosure.

20. A method of provisioning an enclosure to perform data storage operations on behalf of a set of storage processors, the method comprising:
- installing a set of peripheral component interconnect express (PCIe) switches within the enclosure;
- connecting the set of PCIe switches to the set of storage processors, the set of storage processors being external to the enclosure, each storage processor being constructed and arranged to process input/output requests from an external host computer; and
- installing a set of data storage devices within the enclosure, the set of data storage devices being constructed and arranged to persistently store data on behalf of the set of storage processors via PCIe-based communications through the set of PCIe switches;
- wherein connecting the set of PCIe switches to the set of storage processors includes coupling the set of PCIe switches to the set of storage processors while the set of storage processors are connected to an electronic assembly which includes (i) another enclosure, (ii) another set of PCIe switches which installs within the other enclosure, and (iii) another set of data storage devices which installs within the other enclosure.

21. A method as in claim 20 wherein coupling the set of PCIe switches to the set of storage processors includes interconnecting the other electronic assembly between the set of PCIe switches and the set of storage processors so that communications between the set of PCIe switches and the set of storage processors pass through the other electronic assembly.

* * * * *